July 21, 1936.  L. F. THOMPSON  2,048,171
BELT GUARD
Original Filed July 18, 1935
Fig. 1.
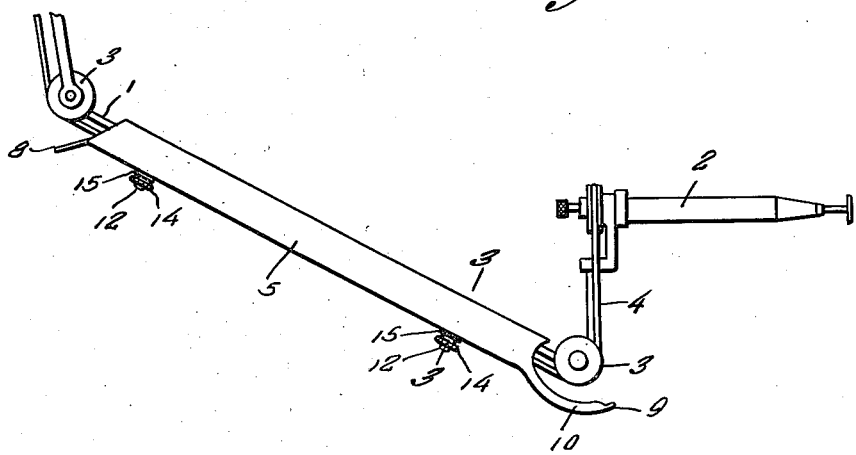
Fig. 2.
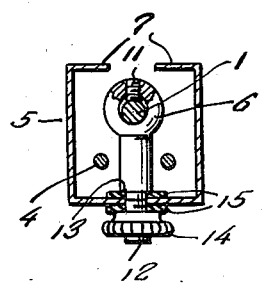
Fig. 3.
Inventor
L. F. Thompson
By Clarence A. O'Brien
Attorney Patented July 21, 1936

2,048,171

UNITED STATES PATENT OFFICE 2,048,171

BELT GUARD

Lyman Foster Thompson, Prairie Grove, Ark.

Application July 18, 1935, Serial No. 32,129
Renewed March 24, 1936

3 Claims. (Cl. 74—611)

The present invention relates to new and useful improvements in belt guards particularly for the arms of dental engines and has for its primary object to provide, in a manner as hereinafter set forth, a device of this character which will prevent the operator's hair from becoming entangled in the belt as well as protect the patient's clothes from grease or oil thrown from said belt and the usual pulleys.

Another very important object of the invention is to provide a belt guard of the aforementioned character which includes novel means for securing said guard in position on the arm of a dental engine.

Other objects of the invention are to provide a belt guard of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of references designate corresponding parts throughout the several views, and wherein:

Figure 1 is a view in side elevation of a belt guard constructed in accordance with the present invention, showing the same mounted on the arm of a dental engine.

Figure 2 is a view in top plan of the invention.

Figure 3 is a cross sectional view, taken substantially on the line 3—3 of Figure 1.

Referring now to the drawing in detail, it will be seen that the reference numeral 1 designates a portion of a dental engine arm on the outer or free end of which the usual hand piece 2 is mounted. Journaled on the arm 1 are pulleys 3 on which the usual endless belt 4 which drives the hand piece 2 is trained.

The embodiment of the present invention which has been illustrated comprises an elongated, substantially channel-shaped body 5 of suitable material, preferably metal, which is adapted to enclose the arm 1 and the two flights of the endless belt 4. Mounted in the substantially channel-shaped member 5 is a pair of longitudinally spaced eye screws 6 through which the dental arm 1 passes. Set screws 11 are provided in the eye screws 6 for securing the channel-shaped member 5 in position on the arm 1, said eye screws 6 being insertable between the flights of the endless belt 4, as illustrated to advantage in Figure 3 of the drawing.

The eye screws 6 include reduced, threaded shanks 12 which extend through openings provided therefor in the bottom of the member 5, said shanks providing shoulders 13. Securing nuts 14 are mounted on the shanks 12. Rubber washers 15 are provided between the shoulders 13, the securing nuts 14 and the bottom of the member 5 for absorbing vibration.

The substantially channel-shaped member 5 is provided, on its longitudinal edges, with inturned flanges 7. Projecting at an angle from the inner end of the bottom portion of the substantially channel-shaped member 5 is a shield 8 for protecting the patient from oil or grease thrown from the belt 4 and the adjacent pulleys 3. Projecting longitudinally from the outer end of the substantially channel-shaped member 5 is an arcuate shield 9 which, it will be observed, includes side flanges 10. As is thought to be apparent, the shield 9 constitutes a guard for the outermost pulleys 3.

It is thought that the manner in which the device functions will be readily apparent from a consideration of the foregoing. With the substantially channel-shaped member 5 in position on the arm 1 it will be substantially impossible for the operator's hair to become entangled in the belt 4 and be carried around the pulleys. In addition, damage to the patient's clothing by grease or oil thrown from the rapidly traveling endless belt 4 will be prevented by reason of the fact that said belt is substantially enclosed by the member 5.

It is believed that the many advantages of a belt guard constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A guard for dental engine arms of the type including spaced plleys and an endless belt trained over said pulleys, comprising an elongated, substantially channel-shaped member for the reception of the arm and the belt, eye screws projecting between the flights of the belt and engaged with the arm for securing said member in position thereon between the pulleys, inturned flanges on the longitudinal edges of said member, a shield projecting at an angle from one end of the member adjacent certain of the pulleys, and an arcuate shield projecting from the other end of said member adjacent the other pulleys, the second named shield including side flanges.

2. A guard for dental engine arms of the type including spaced pulleys and an endless belt trained over said pulleys, comprising a substantially channel-shaped member for the reception of the arm and the belt, eye screws mounted in the member and encircling the arm and secured thereto, said eye screws including reduced, threaded shanks extending through the member, said shanks providing shoulders on the eye screws, nuts threaded on the shanks for securing the eye screws in position, and resilient washers interposed between the shoulders and the member and between the nuts and said member.

3. A guard for dental engine arms of the type including spaced pulleys and an endless belt trained over said pulleys, comprising an elongated substantially-channel-shaped member for the reception of the arm and the belt, eye screws projecting between the flights of the belt and engaged with the arm for securing said member in position between the pulleys, a shield projecting at an angle from one end of the member adjacent certain of the pulleys, and an arcuate shield projecting from the other end of said member adjacent the other pulleys, the second mentioned shield including side flanges.

LYMAN FOSTER THOMPSON.